P. PERRY.
Coffee Pot.
No. 69,017. Patented Sept. 17, 1867.
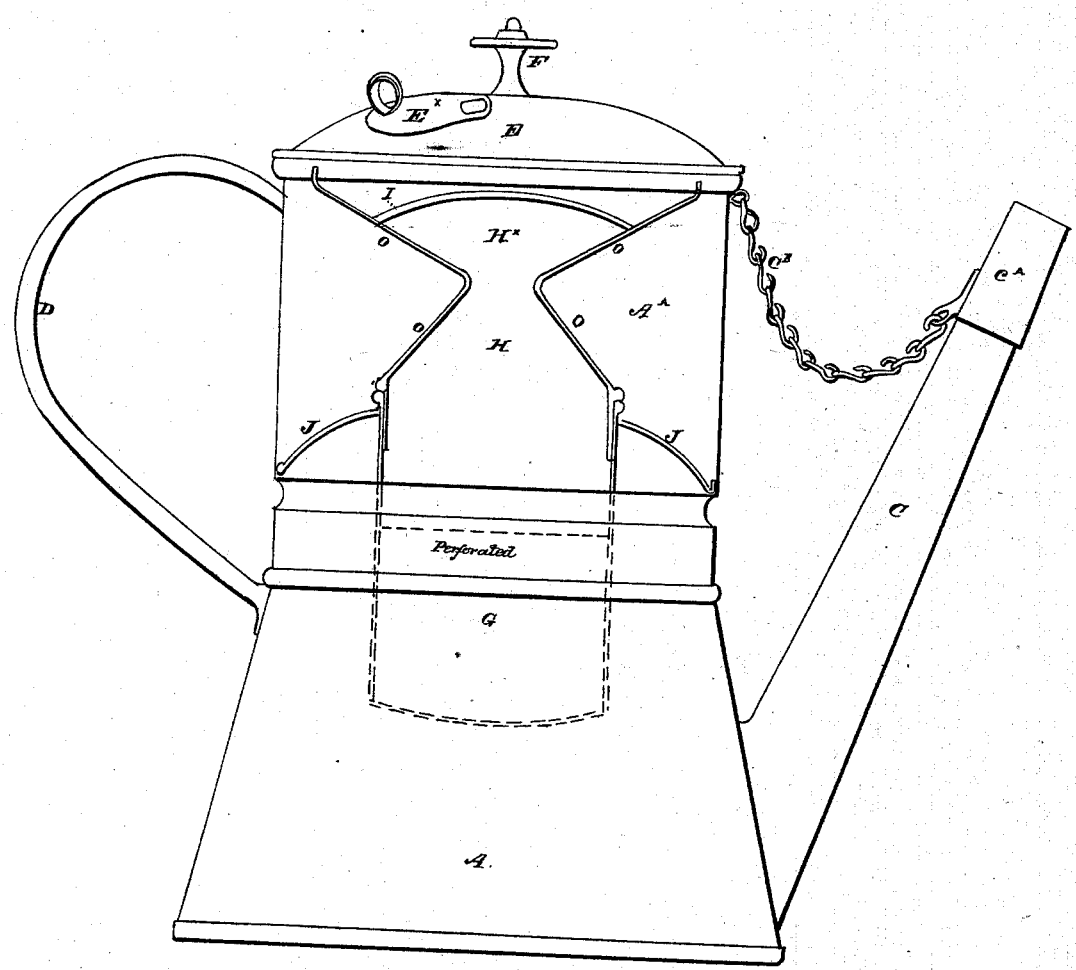

United States Patent Office.

PHILANDER PERRY, OF CHARLESTOWN, MASSACHUSETTS.

Letters Patent No. 69,017, dated September 17, 1867.

COFFEE-POT.

The Schedule referred to in these Letters Patent and making part of the same.

TO ALL WHOM IT MAY CONCERN:

Be it known that I, PHILANDER PERRY, of Charlestown, Middlesex county, State of Massachusetts, have invented a new and improved Coffee-Pot; and I do hereby declare that the following is a full and exact description thereof, reference being had to the accompanying drawings, and to the letters of reference marked thereon.

The nature of my invention consists in certain devices placed in the inside of the coffe-pot, and also an addition to the cover by which I preserve all the aroma of the coffee-berry to flavor the coffee produced, instead of allowing it to escape into the atmosphere and go to waste.

In the drawings annexed, A and $A^A$ represent the body of the coffee-pot. A, the lower part, is in the shape of a truncated cone, whose top reaches to one-half the height of the coffee-pot $A^A$. The upper portion of the pot is in the form of a simple cylinder. E is the cover, with its handle F. $E^x$ is a valve, door, or slide, fastened by a rivet (on which it moves) at one side to the cover, and moving horizontally by means of its handle, covering or uncovering at pleasure a small circular aperture in the cover E, which aperture has across it a piece of finely perforated metal. D is the handle of the pot. C is the spout, with its stopper $C^A$, which is attached to the pot by the chain $C^B$. G is a cylindrical vessel called the tank. This has its bottom perforated with fine holes, and its sides also, to the distance of two-thirds its height, and is held with its axis vertical in the centre of the pot, at a greater or less (optional) distance from the bottom of the pot by means of the inverted shallow cup J J, which is called the radiator. This radiator J J rests with its outer rim on a projection round the interior of the chamber $A^A$, (formed by a groove round the outside of the coffee-pot,) and has a circular hole in its centre into which the tank G slides, fitting closely, and in such manner that the tank can be at pleasure raised or lowered. H $H^x$ is called the tunnel, and is formed of a tunnel, $H^x$, which has a handle, I, which tunnel has attached to its lower part a conduct or spout formed of an inverted tunnel, whose lower or under part has a flange which fits into the top of the tank G. The valve or door $E^x$ is used to moderate the pressure outward of the steam, and obviate the necessity of raising the cover when from any cause too much steam is generated.

And the operation of my combination of devices is as follows: Taking out the tank, radiator, and tunnel, I fill the lower chamber A with water to a depth in proportion to the quantity of liquid coffee I want. Then, by means of the handle I, I remove the tunnel from the tank G, and place in the tank a sufficient quantity of the ground coffee-berry. I then place the tank, tunnel, and radiator in the position seen in the drawing, put on the cover, shutting the aperture $E^x$, and putting the stopper on the spout C. I then apply heat to the water to the point of ebullition. The steam being unable to escape by the spout, passes through the fine perforations of the tank G, through the grains of coffee, saturating them thoroughly with the moisture, and expelling the volatile portions of them, which ascend with the steam through the tunnel H and encounters the cover E, where, being condensed by the comparatively cool metal, it falls down again in a liquid form into the tunnel, which conducts it to the coffee-grains; through these it percolates, and passing through the perforations of the tank mingles with the boiling water below. When the boiling has been carried on sufficiently I pour through the funnel, into the lower chamber, sufficient hot water to bring the extract of coffee below to a sufficient state of dilution, when, all the aroma having been retained in the liquid, none passing into the atmosphere, I remove the cover from the spout and proceed to use the beverage.

And what I claim herein as of my own invention, and desire to secure by Letters Patent, is—

I claim the combination and arrangement in a coffee-pot of the movable perforated tank G and the tunnel H $H^x$, with the close concave radiator or diaphragm support J, when the latter is removable, all substantially as and for the purpose described.

In testimony whereof I have hereunto signed my name and affixed my seal this first day of March, 1866.

PHILANDER PERRY. [L. S.]

Witnesses:
LEMUEL P. JENKS,
CARROLL D. WRIGHT.